United States Patent Office 3,451,750
Patented June 24, 1969

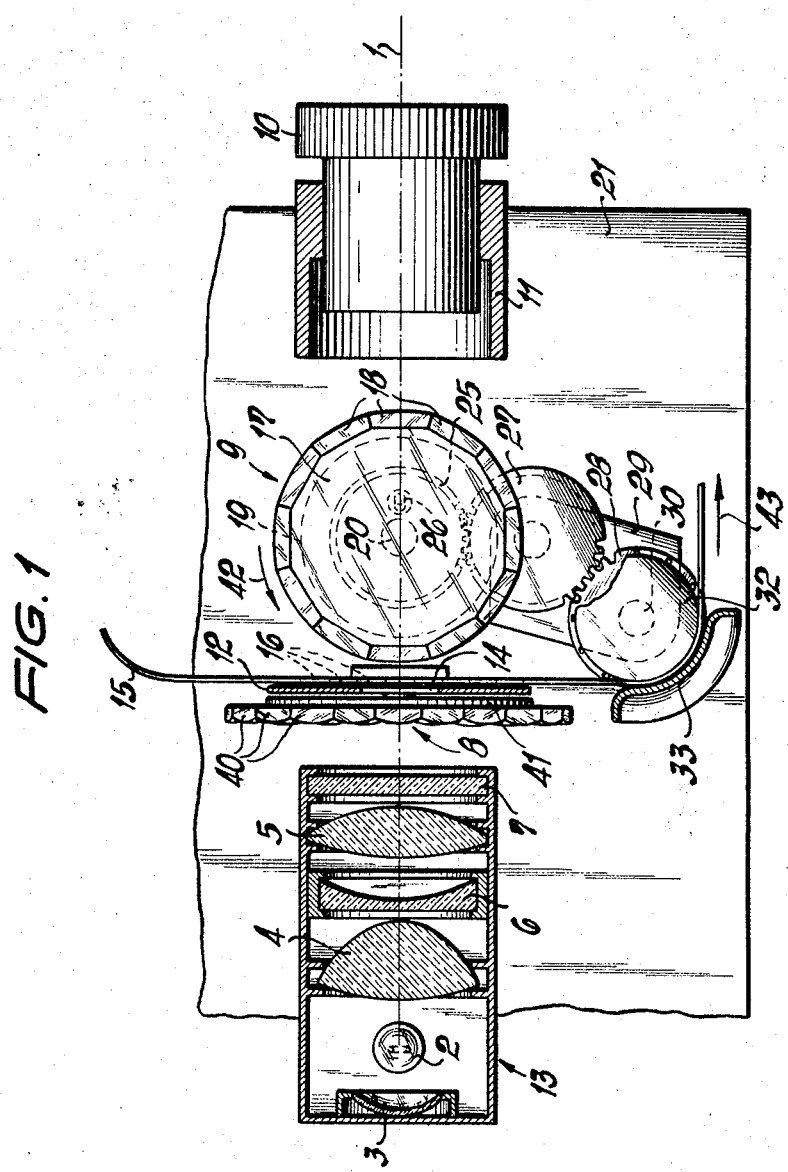

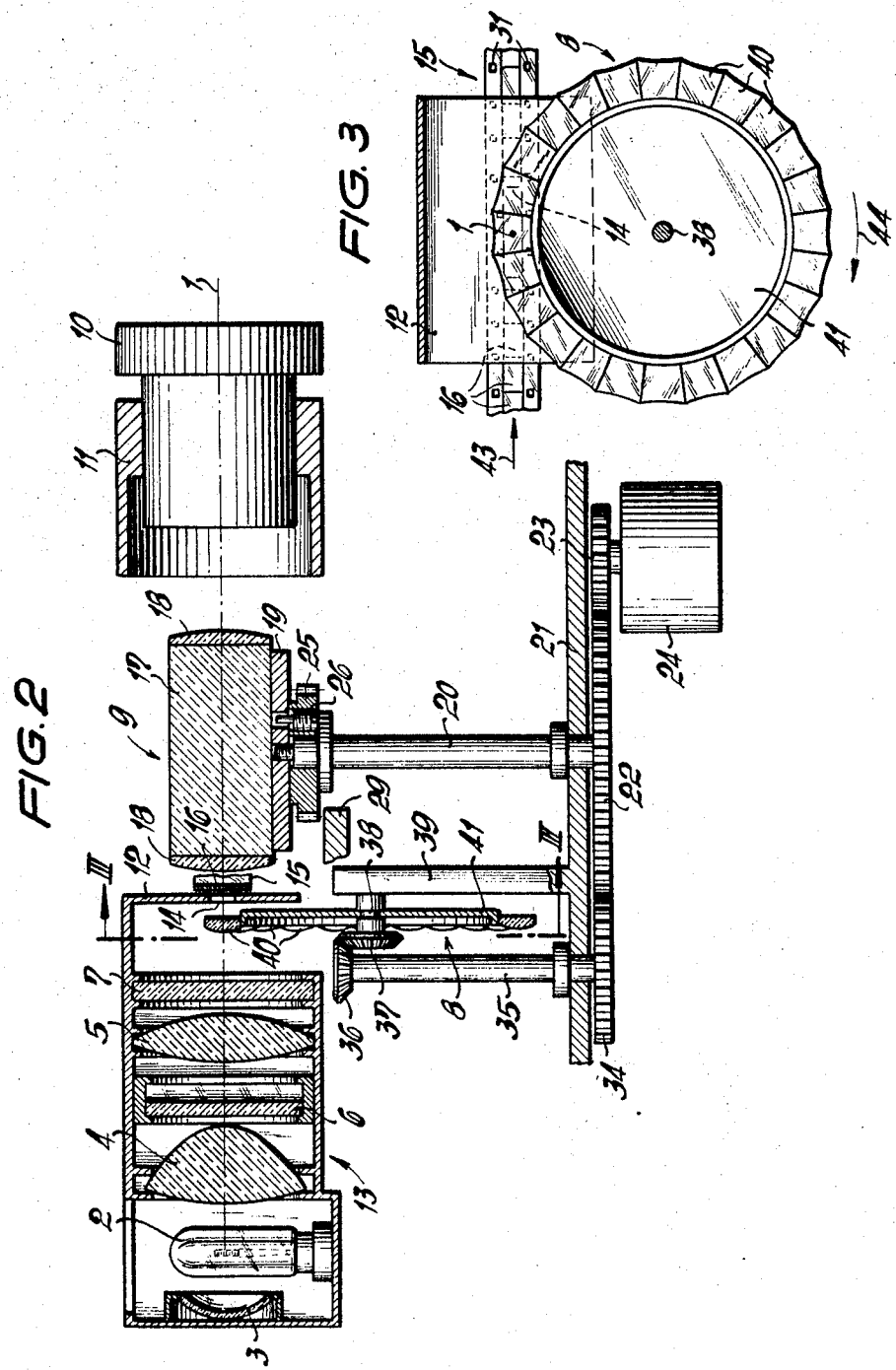

3,451,750
MOTION PICTURE PROJECTOR
Leon W. Wells, Closter, N.J., and Fritz Determann, Braunschweig, Germany, assignors to Panopix Research, Inc., New York, N.Y., a corporation of New York
Filed Mar. 28, 1967, Ser. No. 626,527
Int. Cl. G03b 41/08
U.S. Cl. 352—117    11 Claims

ABSTRACT OF THE DISCLOSURE

A motion picture projector having a light source, condenser system and objective lens with a wall extending across the optical axis formed with an aperture through which the optical axis passes. A continuously moving film is transported past the aperture. A rotary polygonal prism is situated on the objective side of the film for the purpose of compensating for movement of the images resulting from the continuous transportation of the film strip. Between the film and the condenser system is located a rotary ring of lenses for maintaining the light source stationary with respect to the projected image. The film movement, rotation of the polygonal prism and rotation of the ring of lenses are mechanically coordinated so that during the movement of one frame of film past the aperture, the polygonal prism will rotate through one face and the ring of lenses will advance one step.

---

The present invention relates to motion picture projectors.

In particular, the present invention relates to that type of motion picture projector in which the film is continuously transported, the projector being provided with a rotary polygonal prism which compensates for wandering of the images derived from the continuously moving film strip.

With structures of this type it is an exceedingly difficult matter to compensate properly for movement of the image resulting from the continuous transportation of the film strip. The polygonal prisms used for this purpose are exceedingly expensive, and even when they are manufactured and operated with the greatest precision there are still unavoidable drawbacks encountered in practice.

In addition, one of the drawbacks of projectors of the above type is that there is an unavoidable flickering in the projection of the image, and as of the present time this drawback has not been satisfactorily avoided.

It is accordingly a primary object of the present invention to provide a motion picture projector which will avoid the above drawbacks.

In particular, it is an object of the present invention to provide a motion picture projector which will be substantially free of flicker.

Furthermore, it is an object of the present invention to provide a motion picture projector capable of continuously transporting the film while compensating for image movement in a manner superior to conventional structures provided for this purpose.

Also, it is an object of the present invention to provide a motion picture projector of relatively inexpensive construction which can reliably accomplish the above objects.

Primarily the structure of the invention includes a light source and an optical means for directing light from the light source along the optical axis of the projector. A wall extends across the optical axis and is formed with an aperture through which the optical axis passes, and a film transporting means is provided for continuously advancing a film strip past the aperture. A rotary polygonal prism means is situated on one side of the aperture with the optical axis passing therethrough, and this rotary polygonal prism means of the invention includes a circular row of lenses each of which has an outer convex surface and an inner flat surface. Situated on the other side of the aperture is a ring of lenses through which the optical axis also passes, and a drive means is operatively connected to the polygonal prism means for rotating the latter as well as to the ring of lenses for moving the lenses thereof past the aperture.

For the purpose of compensating for movement of the images resulting from the continuous transportation of the film strip, the rotary polygonal prism means is arranged between the film and the objective of the projector, this prism means having a special construction described below. The ring of lenses is carried by a rotary disc situated between the film and the light source, in particular between the film and the condensor system which directs light from the light source through the film, and the individual lenses of the ring of lenses direct the light from the light source with respect to the film so as to cause the light to follow the film movement. The polygonal prism means has an axis of rotation which is perpendicular to the optical axis while the ring of lenses has an axis which is parallel to the optical axis and thus is parallel to the path of light from the light source.

The optical means which is situated between the light source and the aperture includes a cylindrical lens which has a construction which enables it to widen the illumination derived from the light source so as to spread the illumination in the direction of film movement, and this spreading of the illumination takes place not over the length of an an individual film frame, as is conventional, but over a substantially longer length which in the example of the invention is on the order of two and one half times the length of a film frame. As a result, the aperture through which the optical axis passes and through which the light passes so as to pass through the film strip is made correspondingly longer.

The invention is illustrated by way of example in the accompanying drawings which form part of this application and in which:

FIG. 1 is a fragmentary partly sectional and partly schematic plan view of one possible embodiment of a motion picture projector according to the invention, the section of FIG. 1 being taken in a plane which includes the optical axis;

FIG. 2 is a sectional side elevation of the structure of FIG. 1 also taken along the optical axis; and FIG. 3 is a transverse partly sectional and partly schematic view of the structure of FIG. 2 taken along line III—III of FIG. 2 in the direction of the arrows.

As may be seen from FIGS. 1 and 2, the optical axis 1 of the projector of the invention extends along the path along which the light is projected, this optical axis being indicated in dot-dash lines in FIGS. 1 and 2 and by a single dot in FIG. 3. As is apparent from FIGS. 1 and 2, there are arranged along the optical axis and thus along the path of light the following optical elements: the light source in the form of a projection lamp 2, a hollow reflector 3 arranged behind the lamp 2, a condensor system including the lenses 4 and 5 and forming part of an optical means for directing the light from the light source along the optical axis, a cylindrical lens 6, a heat-protective filter 7, a ring of lenses 8 (see also FIG. 3), a rotary polygonal prism means 9, and a projector objective 10 which for the purpose of focusing the image is axially shiftable in a stationary holder 11.

In the region between the ring of lenses 8 and the polygonal prism means 9 the projector is provided with an intermediate wall 12 which, as is apparent from FIG. 2, extends angularly from the lamp and condenser housing 13. This wall 12 is provided at the region of the optical axis with the aperture 14 through which the optical axis passes and through which the light passes to pass through the film so as to derive therefrom the image which is projected. The film 15 is transported past the aperture 14 in a continuous manner guided by a suitable guide with respect to which the film slides or guided by suitable guide rollers, this guiding structure not being illustrated since it is well known. The film strip 15 has the individual film frames 16 shown in FIG. 3.

The rotary polygonal prism means 9 will in a known way compensate for wandering of the images derived from the continuously moving film. This polygonal prism means 9 includes a transparent solid body 17 whose axis coincides with the axis of rotation of the polygonal prism means, this body 17 carrying at its outer periphery a row of identical optical elements which are cemented to the exterior surface of the body 17. In the illustrated example these identical optical elements are in the form of planoconvex lenses 18 having outer convex surfaces respectively forming parts of spheres and inner flat surfaces which are cemented to flat surfaces situated at the outer periphery of the body 17.

This polygonal prism means 9 differs from conventional compensating prisms of this type in that the latter are conventionally made entirely of one piece so that it is necessary to very precisely grind the exterior surfaces of the conventional rotary polygonal prisms. Such prisms have outer flat surfaces. The manufacture of these conventional prisms is exceedingly difficult and expensive because of the precision which is required not only with respect to the angles between the successive flat prism surfaces but also with respect to the thickness of the prism and the accuracy with which it rotates, all of these factors requiring extremely narrow tolerances.

These difficulties are avoided with the polygonal prism means 9 in a sample manner by cementing to the body 17 the separately manufactured optical elements 18 which are identical and capable of being mass produced. The labor costs involved for the prism 9 of the invention is considerably less than that required for the grinding and polishing of conventional one-piece polygonal prisms. In particular, the body 17 need only be manufactured with moderate accuracy. Polishing of its peripheral surface is not required. The high accuracy is required with the structure of the invention only during cementing of the identical optical elements 18 to the body 17 inasmuch as during the setting of the cement it is possible for the optical elements in a relatively simple manner to be properly adjusted by autocollimation, thus achieving in an inexpensive manner results which could only be achieved at great expense with conventional polygonal prisms. This type of manufacture of the polygonal prism 9 of the invention also has the particularly great advantage of providing the possibility of giving the prism in a simple manner, in addition to its property of displacing the light rays while preventing tilting thereof also the possibility of achieving additional optical actions. This result can be achieved for example by making the identical optical elements 18 of a material which has a refractive index which is different from that of the body 17 and/or giving the optical elements 18 a configuration which will produce the desired additional optical effects. Such a configuration is in fact provided in the illustrated example where the optical elements are in the form of planoconvex lenses. One of the important features of the present invention resides in the fact that these elements 18 have exterior surfaces which are convex and respectively form parts of spheres, as contrasted with conventional polygonal prisms where the individual exterior prism surfaces are flat. These exterior surfaces of the prism elements 18 are convex with respect to the axis of rotation of the polygonal prism 9.

As a result of this construction it is possible to avoid the following drawback which is enountered with conventional polygonal prisms even when such prisms are manufactured with the greatest precision with respect to the ideal theoretical dimensions which they require.

One of the drawbacks encountered in practice with conventional prisms is that during the linear film movement and the continuous rotary movement of the polygonal prism which is matched with the film movement there is an unavoidable slipping of the image resulting from the fact that when the conventional polygonal prism is in an angular position where its prism surfaces are parallel to the film plane so that the light path is not displaced when passing through the polygonal prism, the subsequent rotary movement of the prism results in a displacement of the light path while maintaining it parallel to the optical axis, but this displacement cannot be carried out in precise coincidence with the straight-line movement of the film tangentially to the axis of rotation of the poygonal prism. Instead, the displacement of the light path by the conventional prism means takes place according to a sine function dependent upon the angular rotation of the polygonal prism. This unavoidable slipping of the image can indeed, with conventional structures, be eliminated with respect to a central region of each image and parts of each image which extend laterally from the central region thereof symmetrically with respect thereto, if the prism and film movement are carried out in an extremely precise manner, but nevertheless there will remain residual portions of the image field where this image slipping will unavoidably be encountered even if a relatively large number of flat pairs of prism surfaces are provided with a relatively large prism thickness so that for each image movement the required angle of turning of the prism is relatively small.

A further drawback of the known compensating devices resides in the fact that they unavoidably produce errors in the imaging rays, namely spherical aberrations, astigmatism, and curving of the image field. The latter two errors can indeed be reduced by using a relatively great prism thickness and a correspondingly large number of flat prism surfaces, but the influences derived from these measures are limited by given prism dimensions before the errors are reduced to a satisfactory extent.

Still another basic drawback encountered in conventional polygonal prisms is the following:

As a result of the desired strictly parallel displacement of the light path produced by the polygonal prism, the prism thickness, which is to say the distance between a pair of opposed parallel flat prism surfaces of a conventional polygonal prism and the extent of movement of the light path for each unit of angular turning have a predetermined fixed relationship to each other, and they are furthermore adapted to the particular distance between the images on the film strip. This latter distance between the images changes, however, in practice as a result of the frequently encountered shrinking of the film strip itself, so that the path of image movement and the path of light ray displacement provided by the polygonal prism do not correspond properly to each other after such shrinkage of the film strip, and unavoidable slip of the image results. With conventional constructions it is not possible to avoid this latter drawback so that this problem also is encountered in practice.

The above drawbacks of the known polygonal prisms are avoided with the polygonal prism means of the invention by a suitable choice of the radius of curvature of the convex exterior surfaces of the lenses 18, and as a result of this construction it is possible to very greatly reduce the above drawbacks.

The solid body is, as is particularly apparent from FIG. 2, cemented to a supporting disc 19 which is fixed to a rotary shaft 20. This rotary shaft 20 is supported for rotary movement in an intermediate wall 21 and is fixed with a gear 22 which meshes with a gear 23 driven by a motor 24, so that these parts form a drive means for rotating the polygonal prism means 9.

The disc 19 is freely rotatable with respect to a gear 25 which is freely turnable on the shaft 20. This gear 25, however, participates in the rotary movement of the shaft 20 since it is connected to the disc 19 for rotary movement therewith. This connection between the disc 19 and the gear 25 is brought about by way of an adjusting screw 26 which is freely turnable in a bore of the gear 25 and which has an eccentric projection received in a bore of the disc 19. By adjusting the angular position of the adjusting screw 26, the desired accurate relative positions of the gear 25 and the disc 19, with respect to each other, can be determined. Since the gear 25, as is described in greater detail below, is coupled with the drive for the film 15, there is provided, by way of the adjusting screw 26, ultimately the accurate positioning of the individual frames 16 of the film 15 with respect to the plano-convex lenses 18 of the prism means 9. Thus, this adjusting mechanism serves this latter special purpose.

The gear 25 meshes, as indicated in FIG. 1, with an intermediate gear 27 which in turn meshes with a further gear 28, and these gears 27 and 28 are supported for rotary movement by an intermediate wall 29. The shaft 30 to which the gear 28 is fixed also fixedly carries a film-advancing sprocket 32 having at its periphery projections adapted to enter into the perforations 31 (FIG. 3) of the film 15, and a film guide 33 is situated along the sprocket 32, so that in this way a secure guiding and transporting of the film 15 past the aperture 14 is assured. Thus, these latter elements form a film transporting means for transporting the film 15.

As is particularly apparent from FIG. 2, the gear 22 also meshes with an additional gear 34 which is fixed to a rotary shaft 35 which is also supported for rotary movement by the intermediate wall 21. This shaft 35 drives through bevel gears 36 and 37 a shaft 38 supported for rotary movement by a suitable support 39, and it is this shaft 38 which is coaxially fixed with the ring of lenses 8 so as to rotate the latter. This ring of lenses includes a circular row of identical plano-convex lenses 40 which are fixed to a disc 41 fixedly carried by the shaft 38. The individual lenses 40 are cemented to the outer flange of the disk 41, this outer peripheral flange of the disc 41 extending to the left, as viewed in FIG. 2. Since the lenses 40 are not connected into the imaging light rays for the film frames 16, so that they are not required to have the best possible optical imaging output, it is possible to manufacture the lenses 40 from plastic. In this case it is possible to manufacture the lenses 40, not as individual elements, but rather to combine them into a single component, namely a ring-shaped body, as is particularly apparent from FIG. 3. This circular, ring-shaped plastic body, which is thus provided with a number of spherical surfaces corresponding to the number of lenses 40, is then fixed, as by cementing, at its inner peripheral surface onto the outer peripheral surface of the disc 41.

Thus, the drive means formed by the transmission driven by the motor 24 and the motor 24 itself is common to the polygonal prism means 9, the ring of lenses 8, and the film transporting means, and the drive from the motor 24 is constructed in such a way that the movement of the polygonal prism means 9, the ring of lenses 8, and the film strip is carried out in synchronism so that during turning of the prism 9 through one step corresponding to a twelfth of a revolution in the illustrated example where the prism 9 has twelve lenses, the film 15 is advanced through one film frame 16 and the ring of lenses 8 is also advanced through one step. In the illustrated example the ring of lenses 8 includes 24 individual lenses 40, so that in one step during which the polygonal prism 9 turns through a twelfth of a revolution and the film strip 15 advances by a distance equal to one film frame, the ring 8 turns through a twenty-fourth of a revolution. The direction of rotation of the prism 9 is indicated by the arrow 42 in FIG. 1, the direction of movement of the film 15 is indicated by the arrow 43 in FIG. 3, and the direction of rotation of the ring 8 is also illustrated in FIG. 3 by the arrow 44.

As has already been mentioned above, the cylindrical lens 6 achieves a widening of the image of the lamp filament provided in the aperture 14 by the condenser lenses 4 and 5, this widening being in the direction of movement of the film 15. As is apparent from FIGS. 1 and 3 the wall 12 is therefore formed with an aperture 14 whose width is greater than the length of a film frame. In the illustrated example the aperture 14 has a length which is approximately two and one half times the length of a film frame 16. The image of the lamp filament extends therefore, with the illustrated construction, not only over the complete film frame which happens to be in the projecting position, but rather over the latter film frame plus approximately three quarters of each of the adjoining film frames.

An illumination of this type for the individual film frames is not provided with conventional projectors where the light from the lamp is spread only over a width corresponding to the size of an individual film frame. With the latter conventional structures the brightness of the illumination at the ends of an individual film frame is less than at a central portion thereof, and this difference in the distribution of the brightness of the illumination with respect to each individual film frame results during the continuous transportation of the film in producing an essential part of the disturbing and easily noticable flickering of the projected image.

Another factor resulting in flickering with conventional constructions results in the lack of guiding of the light from the light source with respect to the projected image of the continuously moving film, the light moving only along the optical axis while the conventional polygonal prism compensates for the movement of the image. Thus, the polygonal prism will displace the light path while the latter is not in any way acted upon in any way to compensate for the continuous film movement, so that unavoidable flickering also results from this factor. By providing the structure of the invention with the above-described and illustrated rotary ring of lenses 8, this displacement of the light source which is apparent to the eye is eliminated, since the rotary ring of lenses 8 maintains the light source stationary with respect to the projected image. Thus, the above-described projector of the present invention also eliminates this source of flickering and as a result of the simultaneous elimination of the other source of flickering, resulting from distribution of the light only across a single film frame, both of these sources of flickering are almost completely eliminated with the projector of the invention described above and illustrated in the drawings.

A further factor which contributes to the elimination of flickering resides in the fact that the individual lenses 40 have a width which corresponds to the length of a frame 16 of the film strip, as is apparent particularly from FIG. 3. As a result of the synchronous movement of the ring of lenses 8 and film strip 15 the side edges of each individual lens 40 will remain in substantial coincidence with the ends of each individual film frame 16.

An important advantage derived from the above-described and illustrated projector resides in the fact that the illustrated choice of a polygonal prism to compensate for image wandering and the illustrated choice of a rotary ring of lenses for guiding the light from the light source with respect to the film, gives the device a relatively short length in the direction of the optical axis. Insofar as the optical properties of the structure of the invention are concerned, the particular construction of the polygonal prism means 9 and the above-described special features of the invention (spreading of the light by the cylindrical lens 6; corresponding enlargement of the aperture 14; the particular dimensions of the rotary ring of lenses 8) produce for the structure of the invention the capability of projecting an image of high optical quality in an almost flicker-free manner, so that the structure of the invention is considerably superior to comparable known projectors.

What is claimed is:

1. In a motion picture projector, a light source, optical means coacting with said light source for directing light therefrom along a predetermined optical axis, a wall extending across said optical axis and formed with an aperture through which said axis passes, film transporting means for continuously advancing a film strip past said aperture, rotary polygonal prism means situated on one side of said aperture, with said optical axis passing through said polygonal prism means, for compensating for wandering of images projected from the film strip passing across said aperture, a plurality of movable lenses situated on the side of said aperture opposite from said polygonal prisms means for movement past said aperture, and drive means operatively connected to said polygonal prism means and said plurality of lenses for rotating said polygonal prism means and moving said lenses.

2. The combination of claim 1 and wherein said drive means is common to said polygonal prism means and said lenses and is also operatively connected with said film transporting means for driving the latter so that said polygonal prism means, said lenses, and said film transporting means are all driven in synchronism.

3. The combination of claim 1 and wherein an adjusting means is operatively connected to said polygonal prism means for adjusting the angular position thereof with respect to said drive means.

4. The combination of claim 1 and wherein said aperture is wider than a film frame and wherein said optical means includes a cylindrical lens for spreading the light from said light source across said aperture which is wider than said film frame.

5. The combination of claim 4, and wherein said aperture has a width approximately equal to two and one-half times the length of a film frame.

6. The combination of claim 1 and wherein said polygonal prism means is situated in front of and said lenses are situated behind said aperture.

7. The combination of claim 1 and wherein said polygonal prism means has an axis of rotation which is perpendicular to the optical axis and said plurality of lenses being turnable about an axis of rotation which is parallel to the optical axis.

8. The combination of claim 1 and wherein said polygonal prism means includes a body having an outer periphery to which lenses of said polygonal prism are cemented.

9. The combination of claim 1 and wherein said polygonal prism means is situated in front of said aperture and has an axis perpendicular to the optical axis, said plurality of lenses being situated behind said aperture and being rotatable about an axis parallel to the optical axis, and wherein said drive means is common to said polygonal prism means and said lenses and is also operatively connected to said transporting means for driving said transporting means, said polygonal prism means and said plurality of lenses in synchronism, said aperture being substantially wider than the length of a film frame and said optical means including a cylindrical lens for spreading light from the light source across the width of said aperture which is longer than a film frame.

10. The combination of claim 1 and wherein each of the lenses of said plurality of lenses has a width approximately equal to the length of a film frame and said drive means driving said lenses at a speed which maintains said lenses in substantial alignment with the frames of a film strip transported by said transporting means.

11. The combination of claim 1 and wherein said rotary polygonal prism means includes a circular row of lenses having outer convexly curved surfaces and inner flat surfaces, and said movable lenses being carried by a rotary ring and being arranged in a circular row for movement past said aperture during rotation of said ring of lenses.

References Cited

UNITED STATES PATENTS

| | | | |
|---|---|---|---|
| 2,345,602 | 4/1944 | Holman | 352—117 |
| 2,817,995 | 12/1957 | Kirkham | 352—117 |
| 2,972,280 | 2/1961 | Kudar | 352—116 |
| 3,155,979 | 11/1964 | Mast et al. | 352—119 |
| 3,262,750 | 7/1966 | Bottani | 352—119 |

OTHER REFERENCES

Löffler, W.: Optical Compensation by Polygonal Prism, in British Kinematography, vol. 38, issue 3, pp. 61–68, March 1961.

NORTON ANSHER, *Primary Examiner.*

CHARLES B. FUNK, *Assistant Examiner.*

U.S. Cl. X.R.

352—84, 118, 119